(12) United States Patent
Uchida

(10) Patent No.: US 8,789,990 B2
(45) Date of Patent: Jul. 29, 2014

(54) VEHICULAR HEADLAMP

(75) Inventor: Naoki Uchida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 212 days.

(21) Appl. No.: 13/490,135

(22) Filed: Jun. 6, 2012

(65) Prior Publication Data

US 2012/0314439 A1    Dec. 13, 2012

(30) Foreign Application Priority Data

Jun. 10, 2011    (JP) .................. 2011-130475

(51) Int. Cl.
*B60Q 1/04* (2006.01)
*F21S 8/10* (2006.01)
*B60Q 1/076* (2006.01)

(52) U.S. Cl.
CPC .............. *F21S 48/1742* (2013.01); *B60Q 1/04* (2013.01)
USPC .......................................... 362/513; 362/539

(58) Field of Classification Search
CPC .................................. B60Q 1/04; F21S 48/1742
USPC ...................... 362/512, 513, 538, 539
See application file for complete search history.

(56) References Cited

U.S. PATENT DOCUMENTS

| | | | |
|---|---|---|---|
| 5,971,574 A | 10/1999 | Taniuchi | |
| 2007/0291501 A1 | 12/2007 | Yagi | |
| 2011/0280028 A1* | 11/2011 | Uchida | ........................ 362/516 |
| 2012/0268962 A1* | 10/2012 | Uchida | ........................ 362/518 |

FOREIGN PATENT DOCUMENTS

| | | |
|---|---|---|
| JP | 2000-260219 A | 9/2000 |
| JP | 2007-335311 A | 12/2007 |
| JP | 2008-123838 A | 5/2008 |

OTHER PUBLICATIONS

Chinese Office Action issued in Chinese Application No. 201210189251.X dated Apr. 16, 2014.

* cited by examiner

*Primary Examiner* — David V Bruce
(74) *Attorney, Agent, or Firm* — Sughrue Mion, PLLC

(57) ABSTRACT

A vehicular headlamp includes: a light-emitting module; a movement mechanism that moves the light-emitting module; and a reflector having a reflecting surface configured to reflect, toward the front of the lamp, light emitted from the light-emitting module and form a plurality of light distribution patterns in accordance with a position of the moved light-emitting module. The movement mechanism is configured to be capable of translating the light-emitting module to a plurality of positions.

9 Claims, 14 Drawing Sheets

B-B

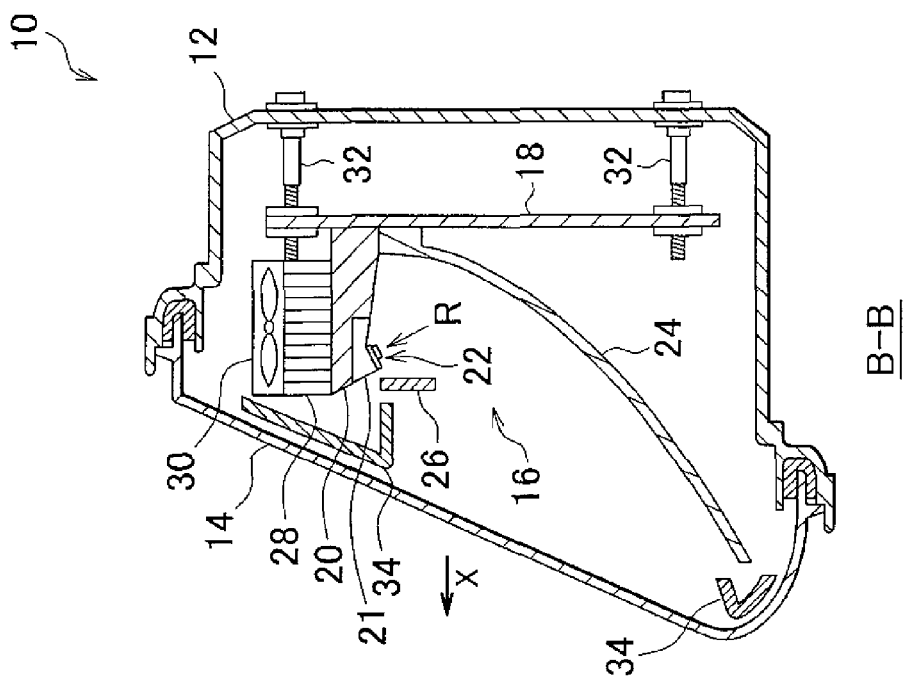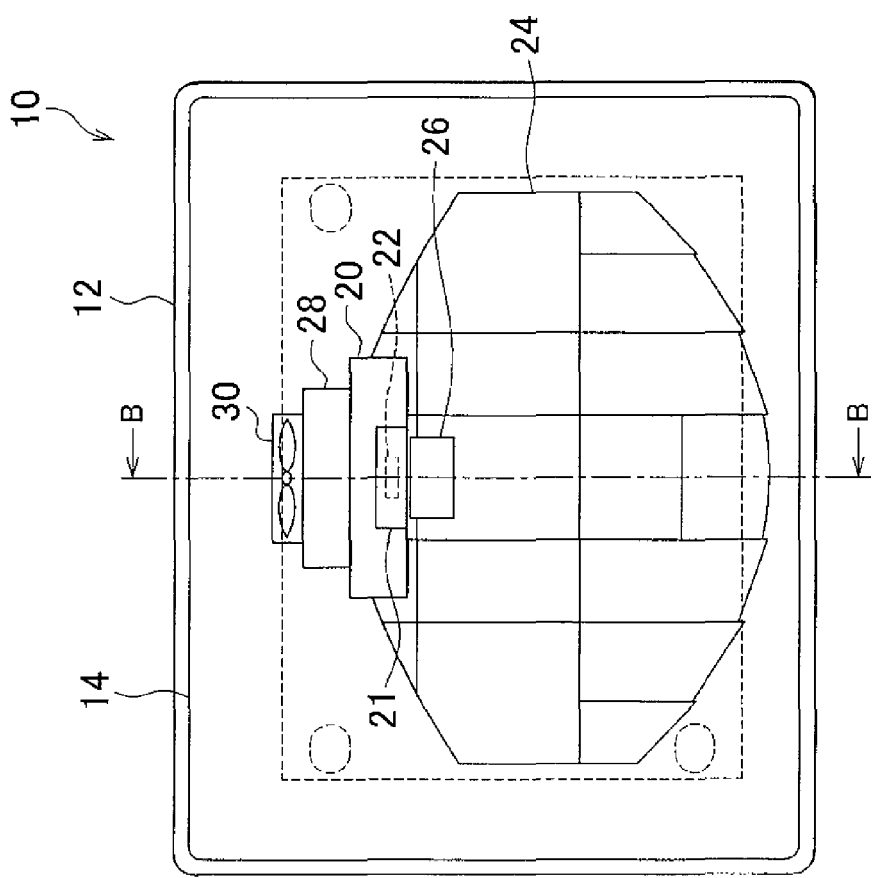

VEHICULAR HEADLAMP

INCORPORATION BY REFERENCE

The disclosure of Japanese Patent Application No. 2011-130475 filed on Jun. 10, 2011 including the specification, drawings and abstract is incorporated herein by reference in its entirety.

BACKGROUND OF THE INVENTION

1. Field of the Invention

The present invention relates to a lamp, and more particularly to a vehicular headlamp including a reflector that reflects light emitted by a light source.

2. Description of Related Art

In recent years, advancements have been made in the development of a vehicular headlamp that uses a semiconductor light-emitting element such as a light emitting diode (LED). In this regard, a vehicular headlamp that forms a light distribution pattern for a hot zone and a light distribution pattern for a diffusion region by reflecting light emitted from each of a plurality of LEDs using a reflector has been proposed. Further, a vehicular headlamp that switches between a plurality of light distribution patterns, using a single light source has been proposed (see Japanese Patent Application Publication No. 2007-335311 (JP-2007-335311 A) or Japanese Patent Application Publication No. 2008-123838 (JP-2008-123838 A), for example).

Incidentally, the vehicular headlamp described above focuses mainly on switching a low beam distribution pattern, and a light distribution above the horizontal line is not taken into consideration.

SUMMARY OF THE INVENTION

The present invention provides a vehicular headlamp that makes it possible to switch between a plurality of light distribution patterns easily using a single light source.

A vehicular headlamp according to a first aspect of the present invention includes: a light source; a movement mechanism configured to be capable of translating the light source to a plurality of positions; and a reflector having a reflecting surface configured to reflect, toward a front of the vehicular headlamp, light emitted from the light source and form a plurality of light distribution patterns in accordance with a position of the translated light source.

According to the first aspect, formation of the plurality of light distribution patterns can be realized by translating the light source.

A second aspect of the present invention is also a vehicular headlamp. This vehicular headlamp includes: a light source; a reflector having a reflecting surface configured to reflect, toward a front of the vehicular headlamp, light emitted from the light source and form a plurality of light distribution patterns in accordance with a position of a real image of the light source or a virtual image of the light source; a light path variation mechanism that varies a light path of the light emitted from the light source; and a movement mechanism that is capable of moving the light path variation mechanism to a region between the light source and the reflector and retracting the light path variation mechanism from the region.

According to the second aspect, formation of the plurality of light distribution patterns can be realized by moving the light path variation mechanism.

According to the present invention, it is possible to switch between a plurality of light distribution patterns easily using a single light source.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a front view of a vehicular headlamp according to a first embodiment;

FIG. 1B is a B-B cross-sectional view of FIG. 1A;

DETAILED DESCRIPTION OF EMBODIMENTS

Figure 2:
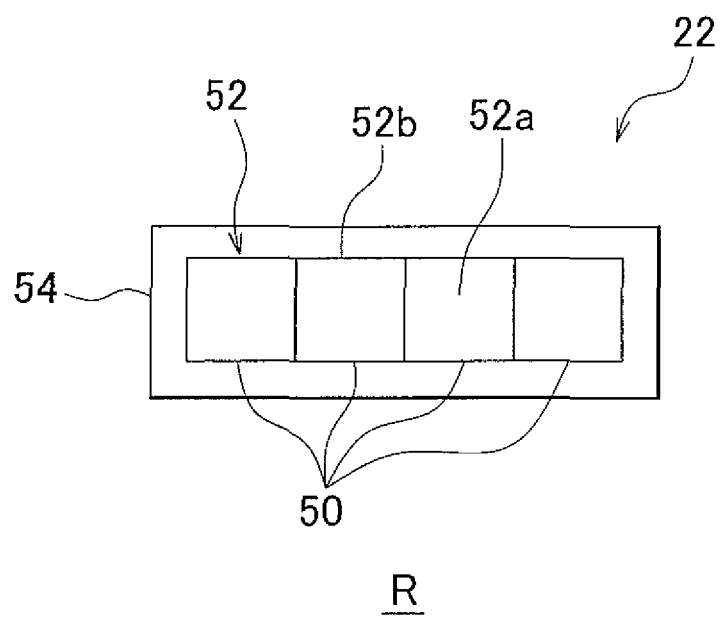
FIG. 2 is a diagram showing a light-emitting module viewed from a viewpoint R in FIG. 1.

Preferred embodiments of the present invention will be described in detail below with reference to the drawings. Note that in the description of the drawings, identical reference symbols have been allocated to identical elements and duplicate description thereof has been omitted as appropriate. Further, a left side light distribution vehicular headlamp will be described below, but the present invention may also be applied to a right side light distribution vehicular headlamp.

First Embodiment

FIG. 1A is a front view of a vehicular headlamp 10 according to a first embodiment, and FIG. 1B is a B-B cross-sectional view of FIG. 1A. The vehicular headlamp 10 includes a housing 12, an outer cover 14, and a lamp unit 16. In the following description, a direction of an arrow X in FIG. 1B is assumed to be a lamp front. Note that the vehicular headlamp 10 is provided in each of a left front portion and a right front portion of a vehicle. FIGS. 1A and 1B show a configuration of the vehicular headlamp 10 of the left side or the right side.

The housing 12 is formed in the shape of a box having an opening. The outer cover 14 is formed in a bowl shape using translucent resin or glass. An edge portion of the outer cover 14 is attached to an opening portion of the housing 12. Thus, a lamp chamber is formed in a region covered by the housing 12 and the outer cover 14.

The lamp unit 16 is provided in the lamp chamber. The lamp unit 16 is disposed in the lamp chamber so as to emit light toward the lamp front. The lamp unit 16 includes a support plate 18, a support member 20, a movement mechanism 21, a light-emitting module 22, a reflector 24, a shade 26, a heat sink 28, and a cooling fan 30. The lamp unit 16 is configured to form a low beam distribution pattern and a high beam distribution pattern to be radiated toward the front of the vehicle. An extension reflector 34 including an opening portion for ensuring that light reflected by the reflector 24 travels toward the front of the lamp is provided on the lamp front side of the lamp unit 16.

Three corner portions of the support plate 18 are fixed to the housing 12 by aiming screws 32. The support member 20 is formed in the shape of a thick rectangular plate, one side face of which is fixed to a front surface of the support plate 18. The movement mechanism 21 is provided on a lower surface of the support member 20. The light-emitting module 22, which serves as a light source, is attached to a lower surface of the movement mechanism 21 such that a main optical axis is oriented slightly toward a lamp rear. The movement mechanism 21 is configured to move the light-emitting module 22. Note that the movement mechanism 21 will be described in detail later.

The support member 20 is formed of a material having high thermal conductivity, such as aluminum, to be able to efficiently collect heat generated by the light-emitting module 22. The cooling fan 30 is attached to an upper surface of the support member 20 via the heat sink 28. Thus, the light-emitting module 22 is cooled by the cooling fan 30 via the movement mechanism 21, the support member 20, and the heat sink 28, whereby an increase in temperature is suppressed.

The reflector 24 is attached to the front surface of the support plate 18 so as to be positioned below the support member 20. The reflector 24 functions as an optical member that condenses, toward the front of the lamp, the light emitted by the light-emitting module 22. Specifically, the reflector 24 forms the low beam distribution pattern and the high beam distribution pattern by reflecting, toward the front of the lamp, the light emitted by the light-emitting module 22.

The shade 26 is formed in the shape of a plate and disposed substantially vertically in the vicinity of the light-emitting module 22. When the light-emitting module 22 has been moved to a first position by the movement mechanism 21, the shade 26 blocks the light that travels above the low beam distribution pattern directly from a light emitting diode (LED) light source and blocks part of the light reflected, toward the front of the lamp, by the reflector 24, the part of the light being reflected by the extension reflector 34 so as to travel above the low beam distribution pattern. As a result, it is possible to suppress the glare exerted on a person existing in front of the vehicle when light is reflected by the extension reflector 34, which is a non-effective reflecting surface. Note that the shade 26 does not have to be disposed vertically, and may be disposed horizontally or disposed so as to be inclined relative to a horizontal direction. Further, the shade 26 is positioned so as not to block the light that travels directly to the reflector 24 from the light-emitting module 22. Furthermore, when the light-emitting module 22 has been moved to a second position by the movement mechanism 21 in order to form the high beam distribution pattern, the shade 26 is positioned such that light reaches above an upper end edge of the low beam distribution pattern.

FIG. 2 is a diagram showing the light-emitting module 22 viewed from a viewpoint R in FIG. 1. The light-emitting module 22 includes a light-emitting element array 52 constituted by a plurality of light-emitting elements 50, and a board 54. In the first embodiment, four light-emitting elements 50 are provided, and the four light-emitting elements 50 are mounted on the board 54. Needless to mention, the number of light-emitting elements 50 is not limited to four, and one light-emitting element 50 or another plural number of light-emitting elements 50 may be provided instead.

The light-emitting element 50 includes a semiconductor light-emitting element (not shown) and fluorescent material (not shown). In the first embodiment, the light-emitting element 50 is provided so as to emit white light. Specifically, a blue LED that mainly emits blue light is used as the semiconductor light-emitting element, while a material that converts the wavelength so as to change the blue light into yellow light is used as the fluorescent material. When the semiconductor light-emitting element emits light, the blue light emitted by the semiconductor light-emitting element and the yellow light resulting from the wavelength conversion by the fluorescent material are additively mixed such that white light is emitted from a light emission surface of the light-emitting element 50. Hence, the semiconductor light-emitting element and the fluorescent material are configured conventionally, and therefore detailed description thereof has been omitted.

Needless to mention, the light-emitting element 50 is not limited to a light-emitting element that emits white light, and a light-emitting element that emits light in another color, such as pale yellow light or pale blue light, may be used instead. Further, the semiconductor light-emitting element may mainly emit light having another wavelength, such as ultraviolet light, for example, instead of blue light.

In the first embodiment, each of the plurality of light-emitting elements 50 is formed in a square shape. Note that each of the light-emitting elements 50 may be formed in a rectangular shape other than a square shape. The plurality of light-emitting elements 50 are arranged in a row such that one end edge abuts one end edge of the adjacent light-emitting element 50, and thereby form the light-emitting element array 52. The light-emitting element array 52 therefore functions as an integrated surface light source having an elongated rectangular light emission surface 52a. Note that a single elongated rectangular light-emitting element may be used instead of the light-emitting element array 52. Further, the light emission surface 52a of the light-emitting element array 52 may be formed in a shape other than a rectangular shape. Furthermore, the light emission surface 52a need not be a flat surface, and may include edges for forming a first cut-off line CL1 and a second cut-off line CL2, as will be described below.

The light emission surface 52a is formed in an elongated rectangular shape, and therefore the light emission surface 52a has a total of four edges, namely two long rectilinear edges and two short rectilinear edges. Of these four edges, an upper end edge 52b, which is the long edge, is used to form a cut-off line of the low beam distribution pattern.

Figure 3A:
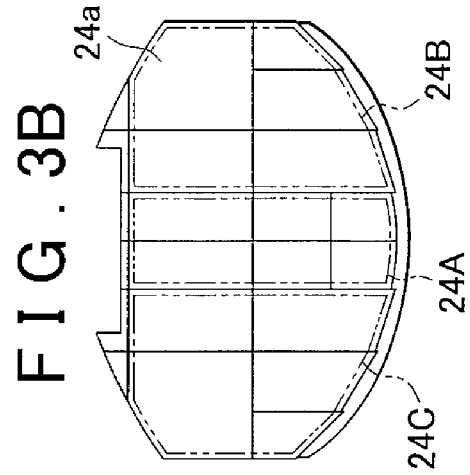
FIGS. 3A to 3D are diagrams showing a shape of a reflector.
Figure 3B:
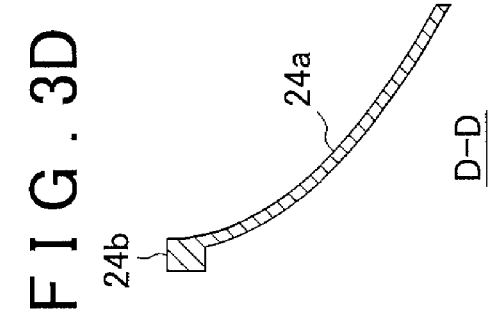
Figure 3C:
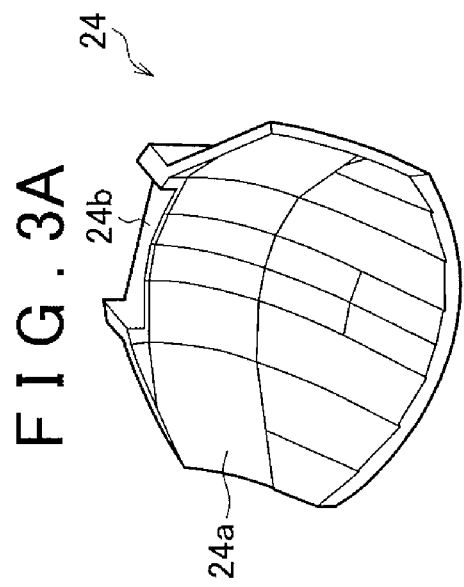
Figure 3D:
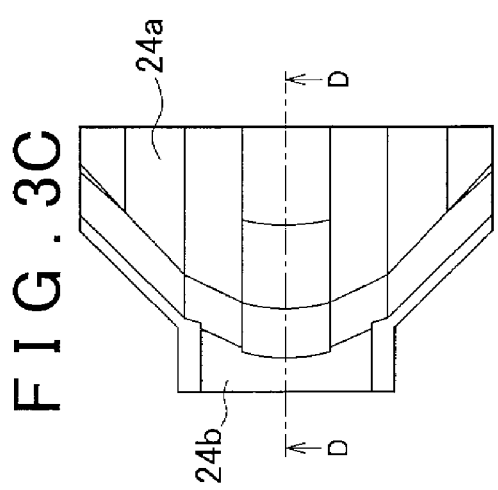

FIGS. 3A to 3D are diagrams showing a shape of the reflector 24. Specifically, FIGS. 3A, 3B, and 3C are, respectively, a perspective view, a front view, and a top view of the reflector 24, while FIG. 3D is a D-D cross-sectional view of FIG. 3C.

The reflector 24 includes a reflecting surface 24a and a recessed portion 24b. The recessed portion 24b is formed in a shape generally identical to a lower outer shape of the support member 20, and the reflector 24 is positioned relative to the support member 20 by fitting the recessed portion 24b onto a lower portion of the support member 20.

The reflecting surface 24a includes a hot zone formation portion 24A and diffusion region formation portions 24B, 24C. The hot zone formation portion 24A is disposed between the diffusion region formation portions 24B, 24C. The diffusion region formation portion 24B is disposed on a right side of the hot zone formation portion 24A when the reflector 24 is seen from the front, or in other words when the reflector 24 is viewed from an observer facing in a lamp rear direction, while the diffusion region formation portion 24C is disposed on a left side of the hot zone formation portion 24A when the reflector 24 is viewed from an observer facing in the lamp rear direction. The hot zone formation portion 24A forms a hot zone light distribution pattern, to be described below, by reflecting, toward the front of the lamp, the light emitted by the light-emitting module 22. The diffusion region formation portions 24B, 24C form a diffusion light distribution pattern, to be described later, by reflecting, toward the front of the lamp, the light emitted by the light-emitting module 22.

The hot zone formation portion 24A is disposed such that an average distance thereof to the light-emitting module 22 is shorter than that of the diffusion region formation portions 24B, 24C. The average distances are average values of distances between respective surfaces of the hot zone formation portion 24A and the diffusion region formation portions 24B, 24C and a center of the light-emitting module 22, and may be calculated by integration. This makes it possible to easily form a hot zone having high illuminance.

The hot zone formation portion 24A and the diffusion region formation portions 24B, 24C respectively include a plurality of segments. Each of the plurality of segments is formed as a smooth curved surface and is connected to an adjacent segment, that is, a segment abutting at an edge, via a step or a crease.

Figure 4:
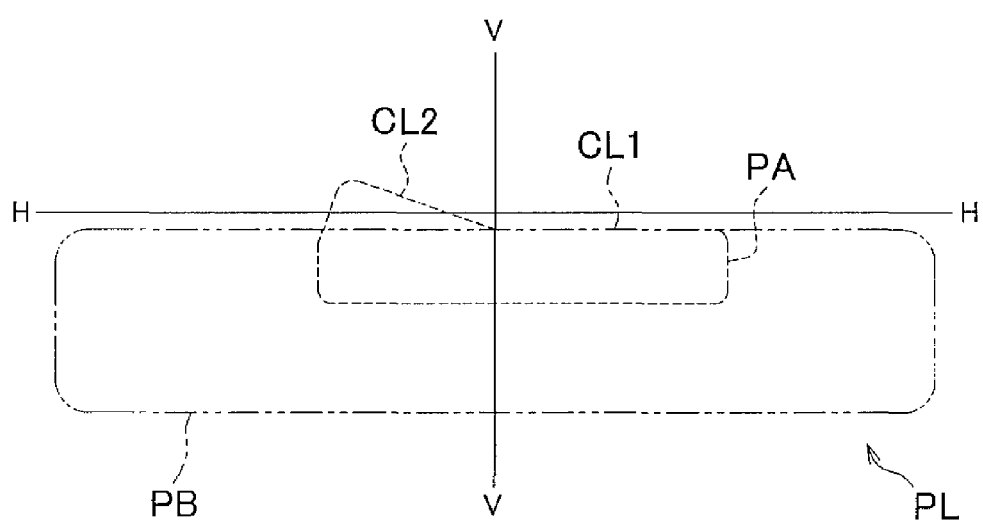
FIG. 4 is a diagram showing a low beam distribution pattern PL formed on an imaginary vertical screen by a lamp unit.

FIG. 4 is a diagram showing a low beam distribution pattern PL formed on an imaginary vertical screen by the lamp unit 16. The low beam distribution pattern PL includes a first cut-off line CL1 and a second cut-off line CL2 that extend in non-parallel so as to intersect each other at an angle. The first cut-off line CL1 extends in a horizontal direction slightly below a horizontal line (an H-H line) (the travel direction of light is oriented 0.6 degrees downward with respect to the horizontal direction) on a right side of a vertical line (a V-V line) that extends in a vertical direction through a vanishing point. The second cut-off line CL2 extends so as to be inclined such that the second cut-off line CL2 extends upward toward the left from an intersection between the first cut-off line CL1 and the V-V line. The aforesaid shade 26 is provided to block light traveling above the first cut-off line and the second cut-off line.

The lamp unit 16 forms the low beam distribution pattern PL. Specifically, the hot zone formation portion 24A forms a hot zone light distribution pattern PA including the first cut-off line and the second cut-off line by reflecting the light emitted by the light-emitting module 22. The diffusion region formation portions 24B, 24C form a diffusion light distribution pattern PB that is longer in the horizontal direction than the hot zone light distribution pattern PA. As described above, the hot zone formation portion 24A is disposed between the diffusion region formation portions 24B, 24C. By disposing the diffusion region formation portions 24B, 24C for diffusing light on the outer sides of the hot zone formation portion 24A in this manner, an increase in the complexity of the shape of the reflector 24 can be avoided.

The low beam distribution pattern PL is formed by superposing the hot zone light distribution pattern PA and the diffusion light distribution pattern PB. The diffusion light distribution pattern PB is formed to extend in the horizontal direction, and has a horizontal direction length equal to that of the low beam distribution pattern PL. The first cut-off line CL1 is formed by an upper end edge of the diffusion light distribution pattern PB on the right side of the V-V line.

The hot zone light distribution pattern PA is formed to include a hot zone of the low beam distribution pattern PL, in which hot zone the illuminance should be increased. The hot zone light distribution pattern PA includes the first cut-off line CL1 and the second cut-off line CL2 intersecting each other at an angle. The hot zone light distribution pattern PA is formed to be shorter than the diffusion light distribution pattern PB in both the horizontal direction and the vertical direction.

Figure 5A:
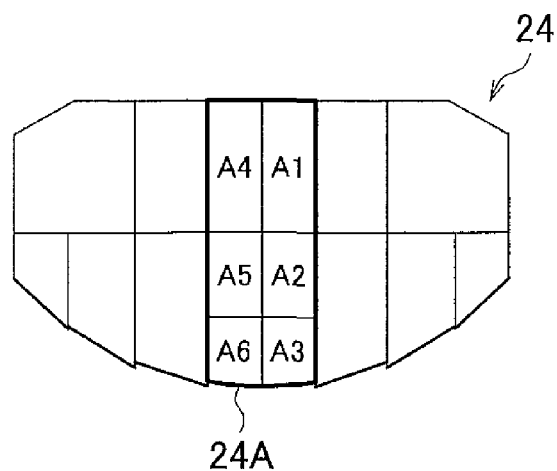
FIG. 5A is a schematic diagram showing respective segments included in a hot zone formation portion.
Figure 5B:
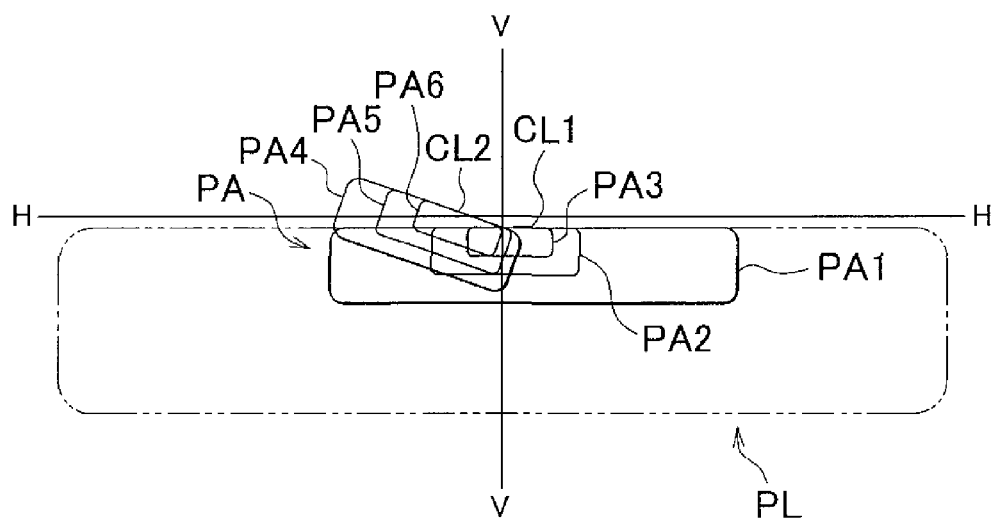
FIG. 5B is a diagram showing a hot zone light distribution pattern PA formed on the imaginary vertical screen by the hot zone formation portion.

FIG. 5A is a schematic diagram showing the respective segments included in the hot zone formation portion 24A, and FIG. 5B is a diagram showing the hot zone light distribution pattern PA formed on an imaginary vertical screen by the hot zone formation portion 24A. FIG. 5A is a diagram showing the reflector 24 viewed from the front, or in other words showing the reflector 24 when the reflector 24 is viewed from an observer facing in the lamp rear direction. FIG. 5B is a diagram showing the hot zone light distribution pattern PA formed on an imaginary vertical screen by the hot zone formation portion 24A when the hot zone formation portion 24A is viewed from an observer facing in the lamp front direction.

The hot zone formation portion 24A includes six segments, namely segments A1 to A6, divided into three rows in the vertical direction and two columns in the lateral direction. The segments A1 to A6 are each formed in a rectangular shape. The segments A1 to A3 are included in a right side column when the reflector 24 is viewed from an observer facing in the lamp rear direction and disposed in the order of A1, A2, A3 from top to bottom. The segments A4 to A6 are included in a left side column when the reflector 24 is viewed from an observer facing in the lamp rear direction and disposed in the order of A4, A5, A6 from top to bottom.

The hot zone light distribution pattern PA is formed by superposing projected images PA1 to PA6. The projected images PA1 to PA6 are formed by reflected light from the respective segments A1 to A6.

The segments A1 to A3 form the projected images PA1 to PA3 extending in the horizontal direction using the configuration, in which the light emission surface 52a is formed in an elongated rectangular shape. Specifically, the projected image PA1 has a horizontal direction length substantially equal to that of the hot zone light distribution pattern PA. The projected image PA1 is formed such that an upper end edge thereof overlaps the first cut-off line CL1. Further, the projected image PA1 is formed such that a central portion thereof in the horizontal direction is positioned on the right side of the V-V line.

The projected image PA2 has a horizontal direction length shorter than that of the projected image PA1. The projected image PA2 is likewise formed such that an upper end edge thereof overlaps the first cut-off line CL1 and a central portion thereof in the horizontal direction is positioned slightly on the right side of the V-V line. The projected image PA3 has a horizontal direction length shorter than that of the projected image PA2. The projected image PA3 is formed such that an upper end edge thereof overlaps the first cut-off line CL1 and a central portion thereof in the horizontal direction is positioned slightly on the right side of the V-V line.

Hence, the segments A1 to A3 form a light distribution pattern in which the projected images PA1 to PA3 are superposed, and therefore a light distribution pattern in which the upper end edge extends in the horizontal direction so as to overlap the first cut-off line CL1 and the illuminance increases toward the vanishing point is formed.

The projected images PA4 to PA6 extending substantially parallel to the second cut-off line CL2 are formed by the respective segments A4 to A6 using the configuration, in which the light emission surface 52a is formed in an elongated rectangular shape. Specifically, the projected image PA4 is formed to extend so as to be inclined such that an upper end edge thereof overlaps the entire length of the second cut-off line CL2. Accordingly, the length of the projected image PA4 is substantially half the length of the hot zone light distribution pattern PA. Further, the projected image PA4 is formed such that a right end portion thereof is positioned slightly to the right of the V-V line and a left end portion of the projected image PA4 is positioned at a left end portion of the hot zone light distribution pattern PA.

The projected image PA5 is formed to be shorter than the projected image PA4 in both a direction parallel to the second cut-off line CL2 and a direction perpendicular to the second cut-off line CL2. The projected image PA5 is likewise formed to extend so as to be inclined such that an upper end edge thereof overlaps the second cut-off line CL2. Further, the projected image PA5 is formed such that a right end portion thereof is positioned between the vanishing point and the right end portion of the projected image PA4 and a left end portion of the projected image PA5 is positioned closer to the vanishing point than the left end portion of the projected image PA4.

The projected image PA6 is formed to be shorter than the projected image PA5 in both the direction parallel to the second cut-off line CL2 and the direction perpendicular to the second cut-off line CL2. The projected image PA6 is likewise formed to extend so as to be inclined such that an upper end edge thereof overlaps the second cut-off line CL2. Further, the projected image PA6 is formed such that a right end portion thereof is positioned between the vanishing point and the right end portion of the projected image PA5 and a left end portion thereof is positioned closer to the vanishing point than the left end portion of the projected image PA5.

Hence, the segments A4 to A6 form a light distribution pattern in which the projected images PA4 to PA6 are superposed, and therefore a light distribution pattern in which the upper end edge extends so as to be inclined so as to overlap the second cut-off line CL2 and the illuminance increases toward the vanishing point is formed.

Here, the hot zone formation portion 24A forms the first cut-off line CL1 and the second cut-off line CL2 using a reflected image of the same upper end edge 52b of the light emission surface 52a. Rapid advancements have been made recently in the development of surface emitting light sources having a planar light emission surface, as represented by an LED. A surface emitting light source has edges. By forming a cut-off line using the edges of the surface emitting light source, a clear cut-off line can be formed easily.

Further, in the first embodiment, the light-emitting element array 52 including the elongated rectangular light emission surface 52a is used as the light source. Therefore, a situation in which the light emitted by the light emission surface in order to form an elongated light distribution pattern is reflected after being diffused excessively can be avoided, and as a result, a clear cut-off line can be formed easily.

Furthermore, the segments A1 to A3 form the first cut-off line CL1 using a reflected image of the upper end edge 52b on the light emission surface 52a, while the segments A4 to A6 form the second cut-off line using a reflected image of the upper end edge 52b on the light emission surface 52a. By forming the first cut-off line CL1 and the second cut-off line CL2 that extend, relative to each other, at an angle using reflected images of the same upper end edge 52b of the light emission surface 52a in this manner, costs relating to the light-emitting element can be suppressed in comparison with a case where the first cut-off line CL1 and the second cut-off line CL2 are formed using reflected images of two light-emitting element arrays 52 extending, relative to each other, at an angle, for example.

Moreover, the segments A1 to A3 that form the first cut-off line CL1 and the segments A4 to A6 that form the second cut-off line CL2 are disposed adjacent to each other. As a result, a size of the hot zone formation portion 24A can be suppressed in comparison with a case where the segments A1 to A3 and the segments A4 to A6 are separated from each other, for example.

Note that any one of the segments A1 to A3 may form the first cut-off line CL1, and in this case, the remaining segments need not form the first cut-off line CL1. Further, any one of the segments A4 to A6 may form the second cut-off line CL2, and in this case, the remaining segments need not form the second cut-off line CL2.

Figure 6A:
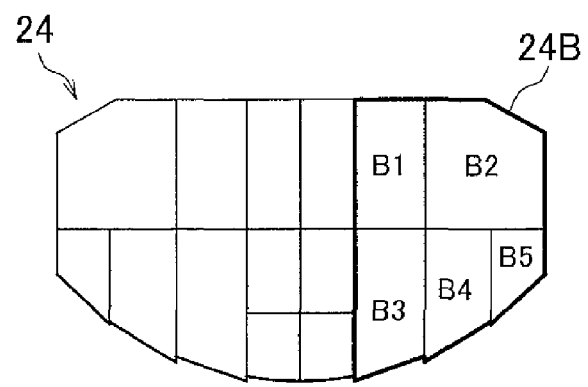
FIG. 6A is a schematic diagram showing respective segments included in a diffusion region formation portion.
Figure 6B:
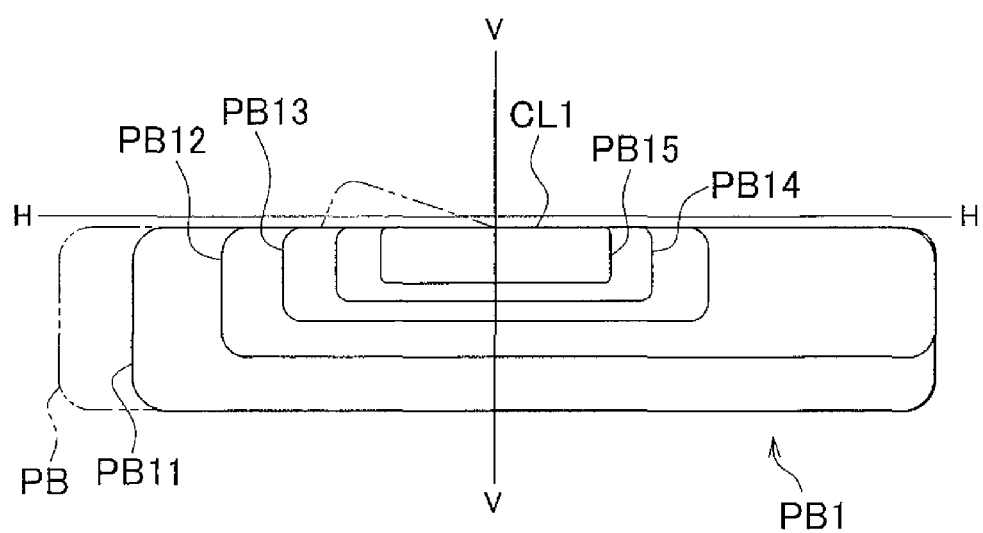
FIG. 6B is a diagram showing a first diffusion light distribution pattern formed on the imaginary vertical screen by the diffusion region formation portion.

FIG. 6A is a schematic diagram showing the respective segments included in the diffusion region formation portion 24B, and FIG. 6B is a diagram showing a first diffusion light distribution pattern PB1 formed on an imaginary vertical screen by the diffusion region formation portion 24B. FIG. 6A is a diagram showing the reflector 24 viewed from the front, or in other words showing the reflector 24 when the reflector 24 is viewed from an observer facing in the lamp rear direction. FIG. 6B is a diagram showing the first diffusion light distribution pattern PB1 formed on an imaginary vertical screen by reflected light from the diffusion region formation portion 24B when the diffusion region formation portion 24B is viewed from an observer facing in the lamp front direction.

The diffusion region formation portion 24B is divided into two rows in the vertical direction. A top row is divided into two segments arranged in the lateral direction, and a bottom row is divided into three segments arranged in the lateral direction. As a result, the diffusion region formation portion 24B is divided into five segments B1 to B5. Each of the segments B1, B2 is formed in a rectangular shape. A lower end edge of the diffusion region formation portion 24B is arc-shaped, and therefore each of the segments B3 to B5 is formed in a trapezoidal shape obtained by obliquely cutting away a lower portion of a rectangle. The segments B1, B2 are disposed in the top row of the diffusion region formation portion 24B in that order from left to right when the reflector 24 is viewed from an observer facing in the lamp rear direction. The segments B3 to B5 are disposed in the bottom row of the diffusion region formation portion 24B in that order from left to right when the reflector 24 is viewed from an observer facing in the lamp rear direction.

The first diffusion light distribution pattern PB1 is formed by superposing projected images PB11 to PB15. The projected images PB11 to PB15 are formed by reflected light from the respective segments B1 to B5.

The projected images PB11 to PB15 extending in the horizontal direction are formed by the respective segments B1 to B5 using the configuration, in which the light emission surface 52a is formed in an elongated rectangular shape. Specifically, the projected image PB11 is formed to extend in the horizontal direction, having a length shorter than the diffusion light distribution pattern PB. At this time, the projected image PB11 is formed such that a right end portion thereof when the projected image PB11 is viewed from an observer facing in the lamp front direction is positioned at a right end portion of the diffusion light distribution pattern PB and a left end portion of the projected image PB11 is positioned closer to the V-V line than a left end portion of the diffusion light distribution pattern PB. Further, the projected image PB11 is formed such that an upper end edge thereof overlaps the first cut-off line CL1.

The projected image PB12 is formed to extend in the horizontal direction, having a length shorter than the projected image PB11. At this time, the projected image PB12 is formed such that a right end portion thereof when the projected image PB12 is viewed from an observer facing in the lamp front direction is positioned at the right end portion of the diffusion light distribution pattern PB and a left end portion of the projected image PB12 is positioned closer to the V-V line than the left end portion of the projected image PB11. Further, the projected image PB12 is formed such that an upper end edge thereof overlaps the first cut-off line CL1.

The projected image PB13 is formed to extend in the horizontal direction, having a length shorter than the projected image PB12. At this time, the projected image PB13 is formed such that a central portion thereof in the horizontal direction is positioned in the vicinity of the V-V line, a left end portion of the projected image PB13 is positioned closer to the V-V line than the left end portion of the projected image PB12, and an upper end edge of the projected image PB13 overlaps the first cut-off line CL1.

The projected image PB14 is formed to extend in the horizontal direction, having a length shorter than the projected image PB13. At this time, the projected image PB14 is formed such that a central portion thereof in the horizontal direction is positioned in the vicinity of the V-V line, left and right end portions of the projected image PB14 are positioned closer to the V-V line than the left and right end portions of the projected image PB13, and an upper end edge of the projected image PB14 overlaps the first cut-off line CL1.

The projected image PB15 is formed to extend in the horizontal direction, having a length shorter than the projected image PB14. At this time, the projected image PB15 is formed such that a central portion thereof in the horizontal direction is positioned in the vicinity of the V-V line, left and right end portions of the projected image PB15 are positioned closer to the V-V line than the left and right end portions of the projected image PB14, and an upper end edge of the projected image PB15 overlaps the first cut-off line CL1.

Figure 7A:
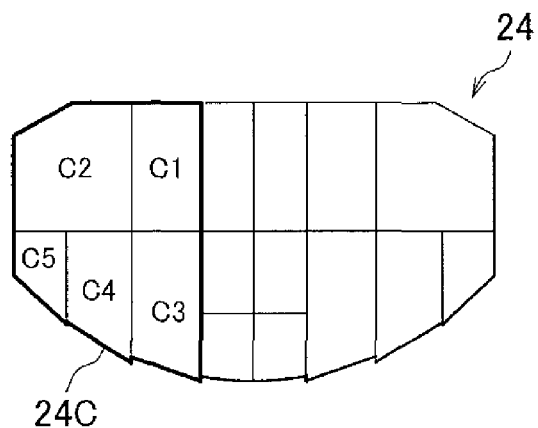
FIG. 7A is a schematic diagram showing respective segments included in a diffusion region formation portion.
Figure 7B:
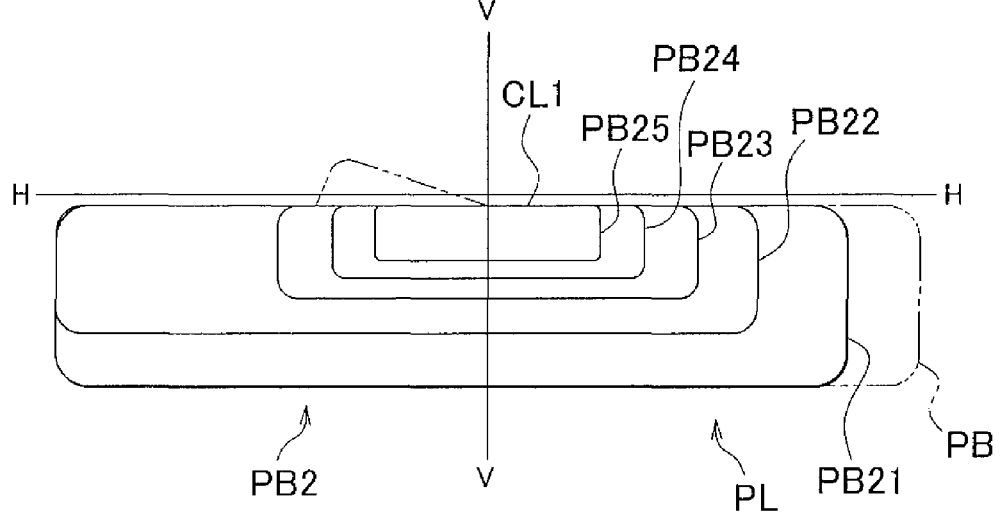
FIG. 7B is a diagram showing a second diffusion light distribution pattern formed on the imaginary vertical screen by the diffusion region formation portion.

FIG. 7A is a schematic diagram showing the respective segments included in the diffusion region formation portion 24C, and FIG. 7B is a diagram showing a second diffusion light distribution pattern PB2 formed on an imaginary vertical screen by the diffusion region formation portion 24C. FIG. 7A is a diagram showing the reflector 24 viewed from the front, or in other words showing the reflector 24 when the reflector 24 is viewed from an observer facing in the lamp rear direction. FIG. 7B is a diagram showing the second diffusion light distribution pattern PB2 formed on an imaginary vertical screen by reflected light from the diffusion region formation portion 24C when the second diffusion light distribution pattern PB2 is viewed from an observer facing in the lamp front direction.

The diffusion region formation portion 24C is divided into two rows in the vertical direction. A top row is divided into two segments arranged in the lateral direction, and a bottom row is divided into three segments arranged in the lateral direction. As a result, the diffusion region formation portion 24C is divided into five segments C1 to C5. Each of the segments C1, C2 is formed in a rectangular shape. A lower end edge of the diffusion region formation portion 24C is arc-shaped, and therefore each of the segments C3 to C5 is formed in a trapezoidal shape obtained by obliquely cutting away a lower portion of a rectangle. The segments C1, C2 are disposed in the top row of the diffusion region formation portion 24C in that order from right to left when the reflector 24 is viewed from an observer facing in the lamp rear direction. The segments C3 to C5 are disposed in the bottom row of the diffusion region formation portion 24C in that order from right to left when the reflector 24 is viewed from an observer facing in the lamp rear direction.

The second diffusion light distribution pattern PB2 is formed by superposing projected images PB21 to PB25. The projected images PB21 to PB25 are formed by reflected light from the respective segments C1 to C5.

The projected images PB21 to PB25 extending in the horizontal direction are formed by the respective segments C1 to C5 using the configuration, in which the light emission surface 52a is formed in an elongated rectangular shape. Specifically, the projected image PB21 is formed to extend in the horizontal direction, having a length shorter than the diffusion light distribution pattern PB. At this time, the projected image PB21 is formed such that a left end portion thereof when the projected image PB21 is viewed from an observer facing in the lamp front direction is positioned at a left end portion of the diffusion light distribution pattern PB and a right end portion of the projected image PB21 is positioned closer to the V-V line than a right end portion of the diffusion light distribution pattern PB. Further, the projected image PB21 is formed such that an upper end edge thereof overlaps the first cut-off line CL1.

The projected image PB22 is formed to extend in the horizontal direction, having a length shorter than the projected image PB21. At this time, the projected image PB22 is formed such that a left end portion thereof when the projected image PB22 is viewed from an observer facing in the lamp front direction is positioned at the left end portion of the diffusion light distribution pattern PB and a right end portion of the projected image PB22 is positioned closer to the V-V line than the right end portion of the projected image PB21. Further, the projected image PB22 is formed such that an upper end edge of the projected image PB22 overlaps the first cut-off line CL1.

The projected image PB23 is formed to extend in the horizontal direction, having a length shorter than the projected image PB22. At this time, the projected image PB23 is formed such that a central portion thereof in the horizontal direction is positioned in the vicinity of the V-V line, a right end portion of the projected image PB23 is positioned closer to the V-V line than the right end portion of the projected image PB22, and an upper end edge of the projected image PB23 overlaps the first cut-off line CL1.

The projected image PB24 is formed to extend in the horizontal direction, having a length shorter than the projected image PB23. At this time, the projected image PB24 is formed such that a central portion thereof in the horizontal direction is positioned in the vicinity of the V-V line, left and right end portions of the projected image PB24 are positioned closer to the V-V line than the left and right end portions of the projected image PB23, and an upper end edge of the projected image PB24 overlaps the first cut-off line CL1.

The projected image PB25 is formed to extend in the horizontal direction, having a length shorter than the projected image PB24. At this time, the projected image PB25 is formed such that a central portion thereof in the horizontal direction is positioned in the vicinity of the V-V line, left and right end portions of the projected image PB25 are positioned closer to the V-V line than the left and right end portions of the projected image PB24, and an upper end edge of the projected image PB25 overlaps the first cut-off line CL1.

Hence, the diffusion region formation portion 24B forms the first diffusion light distribution pattern PB1 in which the projected images PB11 to PB15 are superposed, using the segments B1 to B5. Further, the diffusion region formation portion 24C forms the second diffusion light distribution pattern PB2 in which the projected images PB21 to PB25 are superposed, using the segments C1 to C5. Accordingly, the diffusion region formation portions 24B, 24C form the diffusion light distribution pattern PB, in which the upper end edge extends in the horizontal direction so as to overlap the first cut-off line CL1 and the illuminance increases toward the vanishing point, by superposing the first diffusion light distribution pattern PB1 and the second diffusion light distribution pattern PB2.

Note that the reflecting surface 24a of the reflector 24 according to this embodiment is configured to reflect, toward the front of the lamp unit 16, the light emitted from the light-emitting module 22 and to form a plurality of light distribution patterns in accordance with the position of the light-emitting module 22 that is moved by the movement mechanism 21. The movement mechanism will be described in detail below.

(Movement Mechanism)

Figure 8A:
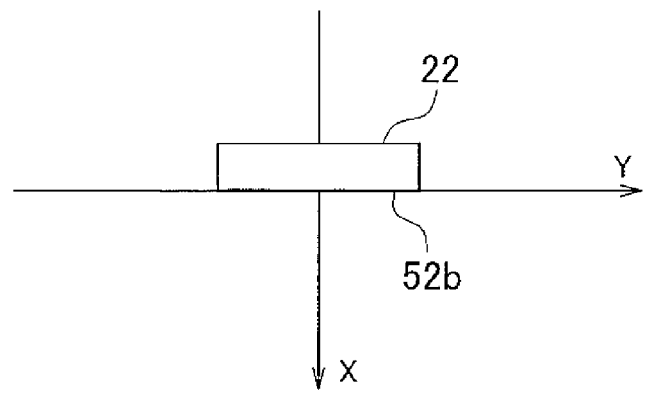
FIG. 8A is a schematic diagram showing a condition, in which the light-emitting module is in a first position, viewed from above the lamp unit.
Figure 8B:
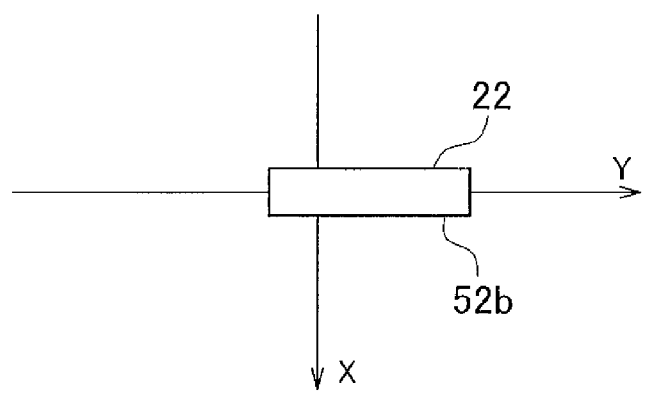
FIG. 8B is a schematic diagram showing a condition, in which the light-emitting module is in a second position, viewed from above the lamp unit.
Figure 8C:
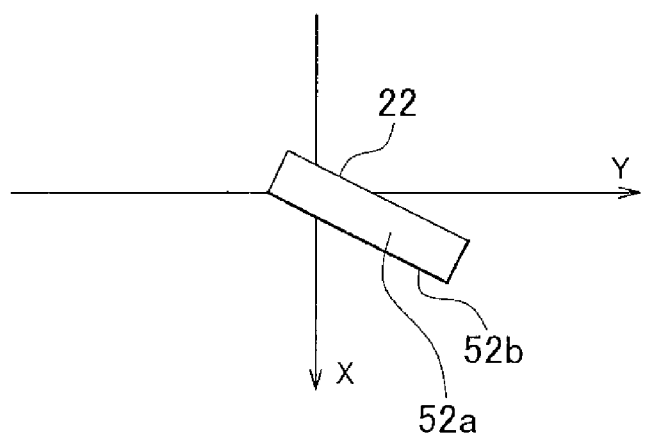
FIG. 8C is a schematic diagram showing a condition, in which the light-emitting module is in a third position, viewed from above the lamp unit.

A function of the movement mechanism 21 shown in FIG. 1 will now be described. FIG. 8A is a schematic diagram showing a condition, in which the light-emitting module 22 is in a first position, viewed from above the lamp unit, FIG. 8B is a schematic diagram showing a condition, in which the light-emitting module 22 is in a second position, viewed from above the lamp unit, and FIG. 8C is a schematic diagram showing a condition, in which the light-emitting module 22 is in a third position, viewed from above the lamp unit. Note that in each of FIGS. 8A to 8C, an X direction corresponds to the lamp front direction and a Y direction corresponds to a vehicle width direction.

Figure 9A:
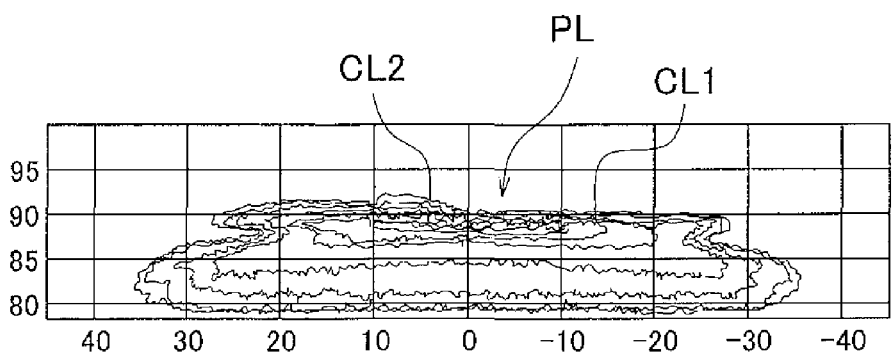
FIG. 9A is a diagram showing an example of a light distribution pattern corresponding to a case in which the light-emitting module is in the first position.
Figure 9B:
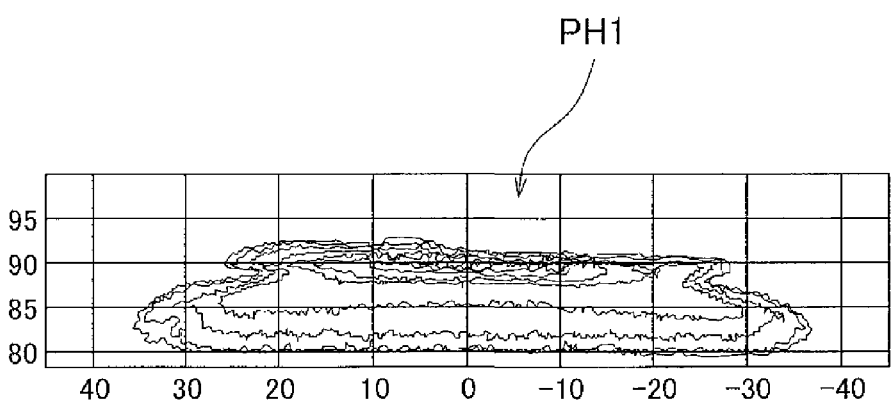
FIG. 9B is a diagram showing an example of a light distribution pattern corresponding to a case in which the light-emitting module is in the second position.
Figure 9C:
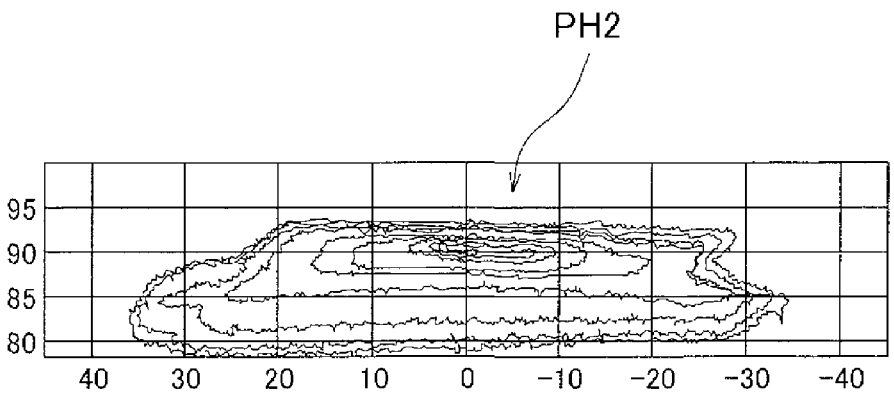
FIG. 9C is a diagram showing an example of a light distribution pattern corresponding to a case in which the light-emitting module is in the third position.

FIG. 9A is a diagram showing an example of a light distribution pattern corresponding to a case in which the light-emitting module 22 is in the first position, FIG. 9B is a diagram showing an example of a light distribution pattern corresponding to a case in which the light-emitting module 22 is in the second position, and FIG. 9C is a diagram showing an example of a light distribution pattern corresponding to a case in which the light-emitting module 22 is in the third position.

When the light-emitting module 22 is in the first position shown in FIG. 8A, the vehicular headlamp 10 is capable of forming the low beam distribution pattern PL including the first cut-off line CL1 and the second cut-off line CL2 that extend in non-parallel so as to intersect each other at an angle, as shown in FIGS. 4 and 9A.

The lamp unit 16 according to this embodiment is configured to be capable of translating the light-emitting module 22 from the first position to the second position shown in FIG. 8B, using the movement mechanism 21. A conventional technique involving a motor, a gear, and so on may be used to realize the movement mechanism 21 having this function. For example, the light-emitting module 22 or a stage on which the light-emitting module 22 is mounted may be caused to slide using an external driving force.

When the light-emitting module 22 is in the second position shown in FIG. 8B, the vehicular headlamp 10 is capable of forming a high beam distribution pattern PH1 having an illumination range that extends further upward than the low beam distribution pattern PL as a whole, as shown in FIG. 9B. In the high beam distribution pattern PH1, the illumination range in a region on an upper side of the horizontal line to the right of the vertical line, which is a range that is not illuminated by the low beam distribution pattern PL, is increased.

Hence, the vehicular headlamp 10 including the lamp unit 16 can form a plurality of light distribution patterns by translating the light-emitting module 22. Further, the movement mechanism 21 is configured to be capable of moving the light-emitting module 22 to a plurality of positions, at each of which the position of the light-emitting module 22 in an optical axis direction of the reflector differs. As a result, a plurality of light distribution patterns having different upper end positions relative to the horizontal line can be formed. In other words, the light-emitting module 22 and the reflector 24 are arranged in a relative positional relationship such that a low beam distribution pattern PL is formed when the light-emitting module 22 is in a first position and a high beam distribution pattern PH1 is formed when the light-emitting module 22 is in a second position that differs from the first position in the optical axis direction of the reflector 24. Examples of the modes that realize such a relative positional relationship include a mode, in which the light-emitting module 22 is positioned upwardly with respect to the reflector 24 that faces obliquely upward as in the case of this embodiment, and a mode, in which the light-emitting module is positioned downwardly with respect to the reflector that faces obliquely downward. In such modes, the planes of incidence of the primary part of the light rays that form the light distribution pattern each extend substantially in the vertical direction.

Here, the optical axis direction of the reflector may be considered as a vehicular longitudinal direction. Accordingly, the plurality of positions at each of which the position in the optical axis direction of the reflector differs may be considered as a plurality of positions from each of which a horizontal direction distance to the reflector differs.

The lamp unit 16 according to this embodiment is configured to be capable of rotating the light-emitting module 22 from the second position to the third position shown in FIG. 8C, using the movement mechanism 21. Note that when the light-emitting module 22 is in the third position, the upper end edge 52b, i.e. the long edge of the light emission surface 52a, is oblique with respect to the optical axis direction of the reflector (the vehicular longitudinal direction). Therefore, in contrast to a case where the long upper end edge 52b of the light emission surface 52a is parallel to the X direction or the Y direction shown in FIGS. 8A to 8C, a new light distribution pattern that is different to a conventional pattern can be formed.

A conventional technique involving a motor, a gear, and so on may be used to realize the movement mechanism 21 having a function of rotating the light-emitting module 22. For example, the light-emitting module 22 or a stage on which the light-emitting module 22 is mounted may be rotated using an external driving force.

When the light-emitting module 22 is in the third position shown in FIG. 8C, the vehicular headlamp 10 is capable of forming a high beam distribution pattern PH2 having an illumination range that extends further upward than the high beam distribution pattern PH1, as shown in FIG. 9C. In the high beam distribution pattern PH2, the illumination range in the region on the upper side of the horizontal line to the right of the vertical line is increased further. Moreover, an upper end of the high beam distribution pattern PH2 is substantially horizontal and extends evenly to a left side region and a right side region of the front of the vehicle.

Hence, the movement mechanism 21 is configured to be capable of translating the light-emitting module 22 and rotating the light-emitting module 22 about an axis that intersects the light emission surface 52a of the light-emitting module 22, and as a result, it is possible to form a plurality of light distribution patterns (three in this embodiment) that cannot be realized simply by translating or rotating the light-emitting module 22.

Note that the light-emitting module 22 may be controlled such that a luminous intensity generated when forming the high beam distribution patterns PH1, PH2, from among the plurality of light distribution patterns, is greater than a luminous intensity generated when forming the low beam distribution pattern PL. This makes it possible to make brighter a region illuminated by the high beam distribution patterns PH1, PH2. For example, a controller that controls a current supplied to the light-emitting module 22 may be provided in or outside the vehicular headlamp 10. The controller controls the current supplied to the light-emitting module 22 and an operation of the movement mechanism 21 on the basis of a driver operation and information such as vehicle travel conditions and the peripheral environment so that an appropriate light distribution pattern is formed.

Second Embodiment

Figure 10:
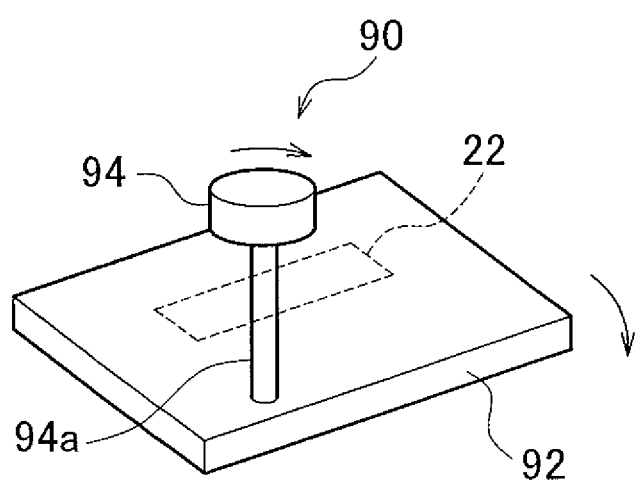
FIG. 10 is a schematic diagram illustrating a movement mechanism according to a second embodiment.

In the first embodiment, the translational movement and the rotational movement of the light-emitting module 22 have been described as separate operations. A movement mechanism according to a second embodiment realizes the translational movement and the rotational movement of the light-emitting module 22 through a single operation. FIG. 10 is a schematic diagram illustrating the movement mechanism according to the second embodiment.

A movement mechanism 90 shown in FIG. 10 is constructed by attaching, to the plate 92, a rotary shaft 94a of a rotating device 94 for rotating a plate 92 carrying the light-emitting module 22. The rotary shaft 94a is attached in a position that intersects an upper surface of the plate 92 and does not overlap the light-emitting module 22 when the plate 92 is seen from directly above.

Figure 11A:
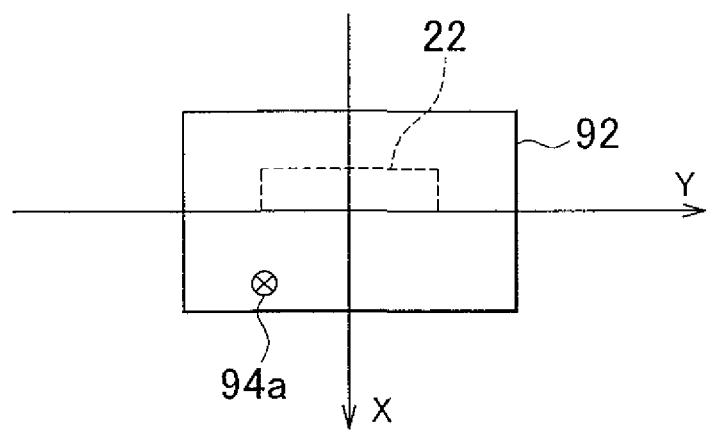
FIG. 11A is a schematic diagram showing a condition, in which a light-emitting module according to the second embodiment is in a first position, viewed from above the lamp unit.
Figure 11B:
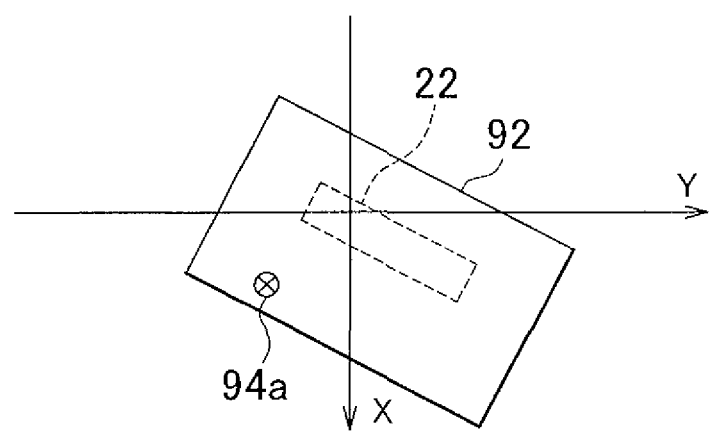
FIG. 11B is a schematic diagram showing a condition, in which the light-emitting module according to the second embodiment is in a second position, viewed from above the lamp unit.

FIG. 11A is a schematic diagram showing a condition, in which the light-emitting module 22 according to the second embodiment is in a first position, viewed from above the lamp unit, and FIG. 11B is a schematic diagram showing a condition, in which the light-emitting module 22 according to the second embodiment is in a second position, viewed from above the lamp unit. Note that in both FIG. 11A and FIG. 11B, the X direction corresponds to the lamp front direction and the Y direction corresponds to the vehicle width direction.

When the light-emitting module 22 is in the first position shown in FIG. 11A, the vehicular headlamp is capable of forming the low beam distribution pattern PL including the first cut-off line and the second cut-off line that extend in non-parallel so as to intersect each other at an angle, as shown in FIGS. 4 and 8A.

The lamp unit 16 according to this embodiment is configured to be capable of rotating the light-emitting module 22 from the first position to the second position shown in FIG. 11B, using the movement mechanism 90.

When the light-emitting module 22 is in the second position shown in FIG. 11B, the vehicular headlamp 10 is capable of forming the high beam distribution pattern PH2 having an illumination range that extends further upward than the high beam distribution pattern PH1, similarly to the first embodiment (see FIG. 8C).

Hence, the vehicular headlamp 10 including the lamp unit 16 is capable of forming a plurality of light distribution patterns by rotating (revolving) the light-emitting module 22. Further, the movement mechanism 90 is configured to be capable of moving the light-emitting module 22 to a plurality of positions, at each of which the position of the light-emitting module 22 in the optical axis direction of the reflector differs. As a result, a plurality of light distribution patterns having different upper end positions relative to the horizontal line can be formed.

Furthermore, when the light-emitting module 22 is in the second position, the upper end edge 52b, i.e. the long edge of the light emission surface 52a, is oblique with respect to the optical axis direction of the reflector (the vehicular longitudinal direction). Therefore, a new light distribution pattern that is different from a conventional pattern can be formed.

A conventional technique involving a motor, a gear, and so on may be used to realize the movement mechanism 90 having a function of revolving the light-emitting module 22 about the rotary shaft 94a. For example, the light-emitting module 22 or the plate 92 carrying the light-emitting module 22 may be rotated using an external driving force.

Hence, the movement mechanism 90 is configured to be capable of revolving the light-emitting module 22 (or rotating the plate 92) about the rotary shaft 94a that intersects a plate region other than the light emission surface 52a. As a result, the translational movement and the rotational movement of the light-emitting module 22 can be realized through a single operation, whereby a plurality of light distribution patterns (two in this embodiment) can be formed.

Third Embodiment

In the embodiments described above, a plurality of light distribution patterns can be formed by moving the light source using various methods. In a vehicular headlamp according to a third embodiment, a mechanism that varies an apparent position of the light source instead of actively moving the light source is employed. In this way, operations and effects similar to those of the embodiments described above are obtained.

Figure 12:
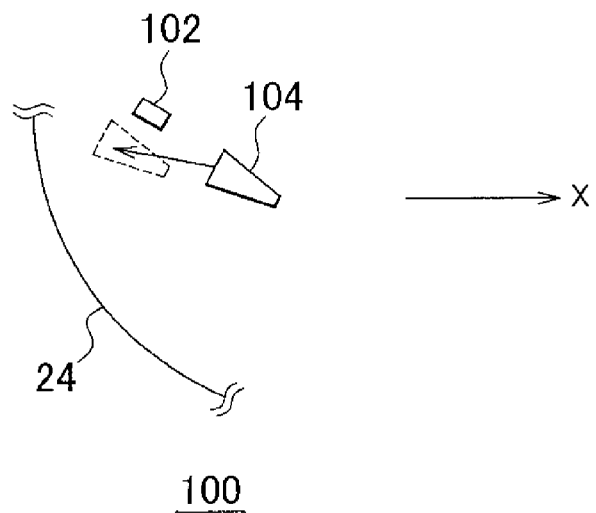
FIG. 12 is a schematic diagram showing an outline of the configuration of a vehicular headlamp according to a third embodiment.

FIG. 12 is a schematic diagram showing an outline of the configuration of the vehicular headlamp according to the third embodiment. A vehicular headlamp 100 shown in FIG. 12 includes a light source 102, the reflector 24, which has a reflecting surface configured to reflect, in the lamp front direction (the direction of an arrow X), light emitted from the light source 102 in order to form a plurality of light distribution patterns in accordance with the position of a real image of the light source or a virtual image of the light source, a prism 104 serving as a light path variation mechanism that varies a light path of the light emitted from the light source, and a movement mechanism 106 (see FIG. 13) that moves the prism 104 to a region between the light source 102 and the reflector 24 and retracts the prism 104 from this region.

Figure 13:
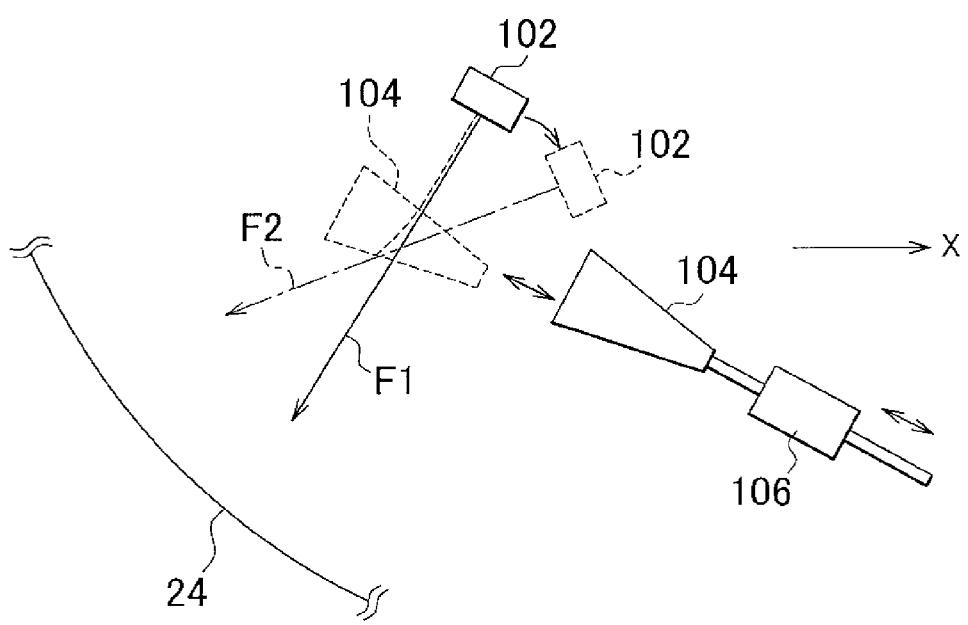
FIG. 13 is a schematic diagram illustrating variation in a light path corresponding to the advancement and retraction of a prism.

FIG. 13 is a schematic diagram illustrating variation in the light path corresponding to advancement and retraction of the prism. As shown in FIG. 13, in a condition where the prism 104 has retreated from the region between the light source 102 and the reflector 24, a light distribution pattern is formed by light (arrow F1) traveling directly to the reflector 24 from the light source 102. In a condition where the prism 104 has been caused to slide by the movement mechanism 106 so as to enter the region between the light source 102 and the reflector 24, on the other hand, the light emitted from the light source 102 is refracted by the prism 104 such that a light distribution pattern is formed by light traveling toward the reflector 24 on a light path indicated by a dotted line arrow F2.

As a result of this action of the prism 104, a virtual image position of the light source (the position of the light source indicated by a dotted line in FIG. 13) appears to have moved toward the vehicle front side relative to a real image position of the light source (the position of the light source shown by a solid line in FIG. 13). The vehicular headlamp 100 according to this embodiment can form a plurality of light distribution patterns by moving the light path variation mechanism so as to vary the apparent position of the light source.

Figure 14A:
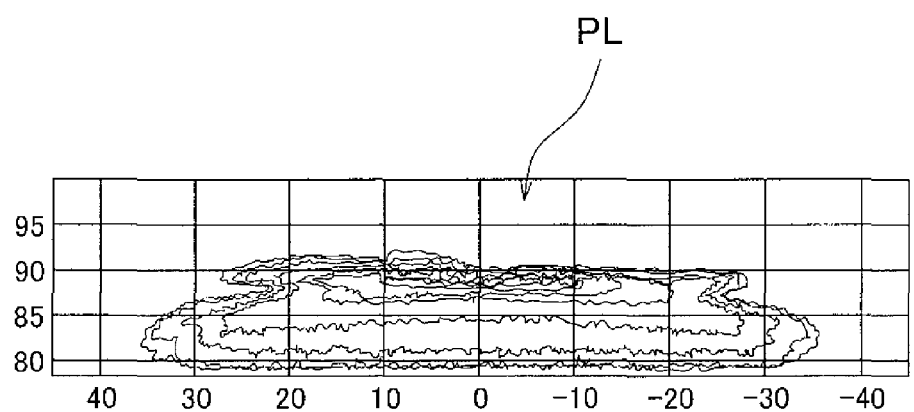
FIG. 14A is a diagram showing an example of a light distribution pattern corresponding to a case in which the light source is in a first position (a position of a real image)
Figure 14B:
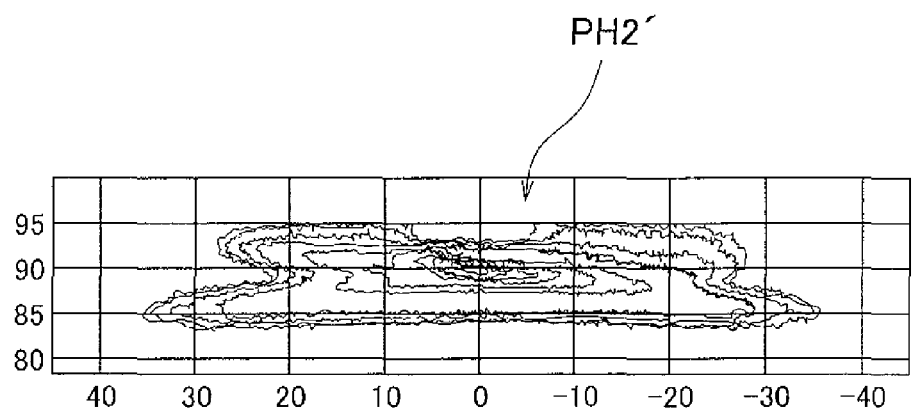
FIG. 14B is a diagram showing an example of a light distribution pattern corresponding to a case in which the light source is in a second position (a position of a virtual image)

FIG. 14A is a diagram showing an example of a light distribution pattern corresponding to a case in which the light source 102 is in a first position (the real image position), and FIG. 14B is a diagram showing an example of a light distribution pattern corresponding to a case in which the light source 102 is in a second position (the virtual image position). As shown in FIGS. 14A and 14B, the vehicular headlamp 100 according to this embodiment is likewise capable of forming two light distribution patterns, namely the low beam distribution pattern PL and a high beam distribution pattern PH2', using the single light source 102.

Further, with the vehicular headlamp 100, the illumination region extends above the horizontal line as shown by the high beam distribution pattern PH2' shown in FIG. 14B. This is because insertion of the prism 104 changes an incline of the light source image projected onto the hot zone formation portion 24A and the diffusion region formation portions 24B, 24C of the reflector 24 so that the hot zone light distribution pattern and the diffusion light distribution pattern move upward as a whole. Furthermore, the amount by which the hot zone light distribution pattern and the diffusion light distribution pattern move upward due to insertion of the prism 104 can be adjusted by varying the shape of the prism, and it is made possible to eliminate a cut-off line such as that appearing on the low beam distribution pattern PL.

Figure 15A:
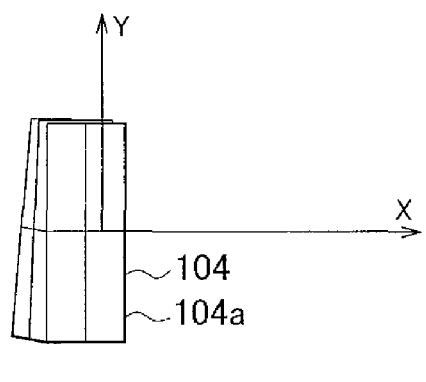
FIG. 15A is a top view of the prism according to the third embodiment.
Figure 15B:
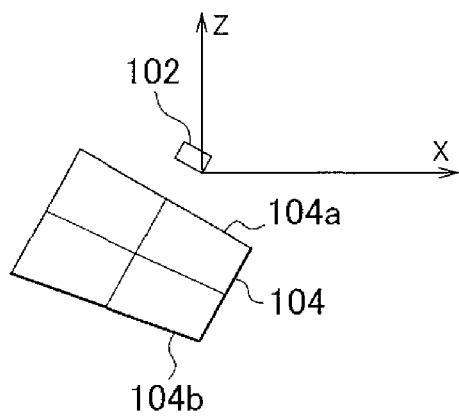
FIG. 15B is a side view of the prism.
Figure 15C:
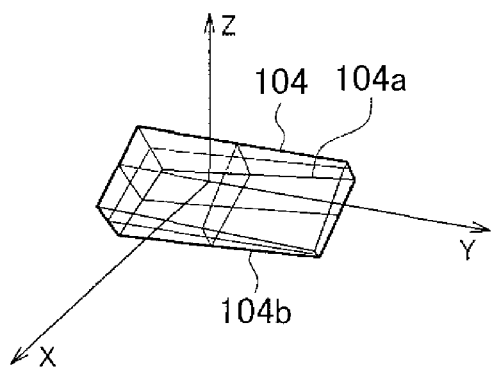
FIG. 15C is a perspective view of the prism.
Figure 15D:
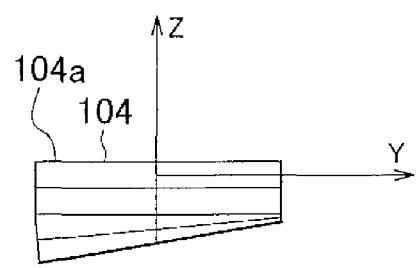
FIG. 15D is a front view of the prism.

FIG. 15A is a top view of the prism according to the third embodiment, FIG. 15B is a side view of the prism, FIG. 15C is a perspective view of the prism, and FIG. 15D is a front view of the prism.

As shown in FIGS. 15A to 15D, the prism 104 has six faces. An incident surface 104a, on which the light emitted from the light source 102 is incident, and an emission surface 104b are generally rectangular. The four surfaces on the periphery of the incident surface 104a and the emission surface 104b are shaped differently from each other and prescribed such that an angle formed by the incident surface 104a and the emission surface 104b is a predetermined angle.

While the invention has been described above with reference to the respective embodiments, the invention is not limited to the embodiments described above and includes modifications, in which features of the embodiments are appropriately combined or replaced. Further, combinations and processing sequences of the respective embodiments may be switched appropriately and various alterations such as design modifications may be made to the embodiments on the basis of the knowledge of persons skilled in the art, and these altered embodiments are also be included in the scope of the invention.

The movement mechanism may be configured to be capable of moving the light source to a plurality of positions, at each of which a position of the light source in an optical axis direction of the reflector differs. With this configuration, a plurality of light distribution patterns having different upper end positions relative to the horizontal line can be formed.

The movement mechanism may be configured to be capable of rotating the light source about an axis that intersects a plane including a light emission surface of the light source. With this configuration, it is possible to form a plurality of light distribution patterns that cannot be realized simply by translating or rotating the light source the light source.

A controller configured to control the light source such that the luminous intensity generated when the high beam distribution pattern is formed is greater than the luminous intensity generated when the low beam distribution pattern is formed may be further provided. With this configuration, the region illuminated by the high beam distribution pattern can be made brighter.

What is claimed is:

1. A vehicular headlamp comprising:
   a light source;
   a movement mechanism configured to be capable of translating the light source to a plurality of positions; and
   a reflector having a reflecting surface configured to reflect, toward a front of the vehicular headlamp, light emitted from the light source and form a plurality of light distribution patterns in accordance with a position of the translated light source.

2. The vehicular headlamp according to claim 1, wherein the movement mechanism is configured to be capable of moving the light source to a plurality of positions, at each of which a position of the light source in an optical axis direction of the reflector differs.

3. The vehicular headlamp according to claim 1, wherein the movement mechanism is configured to be capable of rotating the light source about an axis that intersects a plane including a light emission surface of the light source.

4. The vehicular headlamp according to claim 1, wherein the plurality of light distribution patterns include a low beam distribution pattern and a high beam distribution pattern.

5. The vehicular headlamp according to claim 4, wherein the light source and the reflector are arranged in a relative positional relationship such that the low beam distribution pattern is formed when the light source is in a first position and the high beam distribution pattern is formed when the light source is in a second position that differs from the first position in the optical axis direction of the reflector.

6. The vehicular headlamp according to claim 4, further comprising
a controller configured to control the light source such that a luminous intensity generated when the high beam distribution pattern is formed is greater than a luminous intensity generated when the low beam distribution pattern is formed.

7. A vehicular headlamp comprising:
a light source;
a reflector having a reflecting surface configured to reflect, toward a front of the vehicular headlamp, light emitted from the light source and form a plurality of light distribution patterns in accordance with a position of a real image of the light source or a virtual image of the light source;
a light path variation mechanism that varies a light path of the light emitted from the light source; and
a movement mechanism that is capable of moving the light path variation mechanism to a region between the light source and the reflector and retracting the light path variation mechanism from the region.

8. The vehicular headlamp according to claim 7, wherein the light path variation mechanism is configured so that, when the light path variation mechanism is moved to the region between the light source and the reflector, the light path variation mechanism varies the light path of the light emitted from the light source so that a position of the virtual image of the light source differs from a position of the real image of the light source in an optical axis direction of the reflector.

9. The vehicular headlamp according to claim 8, wherein the light source and the reflector are arranged in a relative positional relationship such that a low beam distribution pattern is formed when the real image of the light source is in a first position and a high beam distribution pattern is formed when the virtual image of the light source is in a second position that differs from the first position in the optical axis direction of the reflector.

* * * * *